United States Patent [19]

Le Van Suu

[11] Patent Number: 5,400,330
[45] Date of Patent: Mar. 21, 1995

[54] SYSTEM FOR THE TRANSMISSION OF DATA IN AN INSTALLATION, NOTABLY A DOMESTIC INSTALLATION

[75] Inventor: Maurice Le Van Suu, Romainville, France

[73] Assignee: SGS-Thomson Microelectronics S.A., Gentilly, France

[21] Appl. No.: 61,866

[22] Filed: May 14, 1993

[30] Foreign Application Priority Data

May 15, 1992 [FR] France ................... 92 05943

[51] Int. Cl.$^6$ ............................. H04J 3/22
[52] U.S. Cl. ................................... 370/84
[58] Field of Search ............... 370/97, 84, 110.1, 85.1, 370/13.1, 67, 35, 85.2, 85.3, 85.4, 85.5, 85.15, 85.14, 85.13, 79, 94.1, 94.2, 60, 60.1; 375/3, 5, 36, 121; 359/174, 176, 136; 340/825.5, 825.51; 341/61

[56] References Cited

U.S. PATENT DOCUMENTS

| | | | |
|---|---|---|---|
| 4,229,815 | 10/1980 | Cummiskey | 370/84 |
| 4,667,319 | 5/1987 | Chum | 370/97 |
| 4,761,800 | 8/1988 | Lese et al. | 375/117 |
| 4,894,847 | 1/1990 | Tjahjadi et al. | 370/84 |
| 5,144,666 | 9/1992 | Le Van Suu | 380/38 |

FOREIGN PATENT DOCUMENTS 2553950 4/1985 France .

OTHER PUBLICATIONS

Electronique Radio Plans ,No. 521, Apr. 1991, Paris, France, pp. 61-67, B. Delabre et al., "Le 2D bus".

*Primary Examiner*—Douglas W. Olms
*Assistant Examiner*—Ajit Patel
*Attorney, Agent, or Firm*—Wolf, Greenfield & Sacks

[57] ABSTRACT

The system for the transmission of data in an installation having a plurality of devices connected into a network, the devices being capable of receiving and transmitting data elements at one of at least two transmission speeds. The system further includes a relaying apparatus having a mechanism for receiving and transmitting data at each of the transmission speeds so as to provide for the transmission of data elements among the devices working at different transmission speeds.

14 Claims, 4 Drawing Sheets

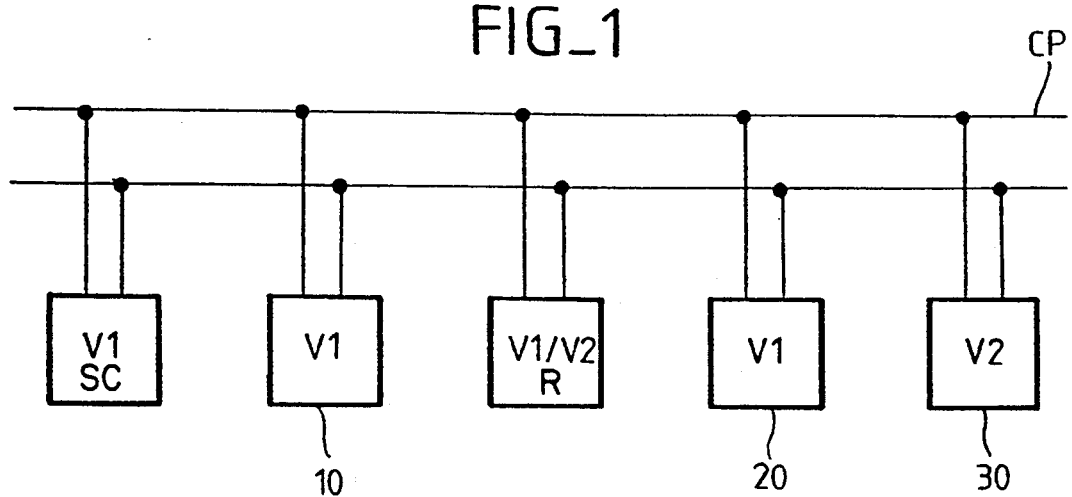
FIG_1
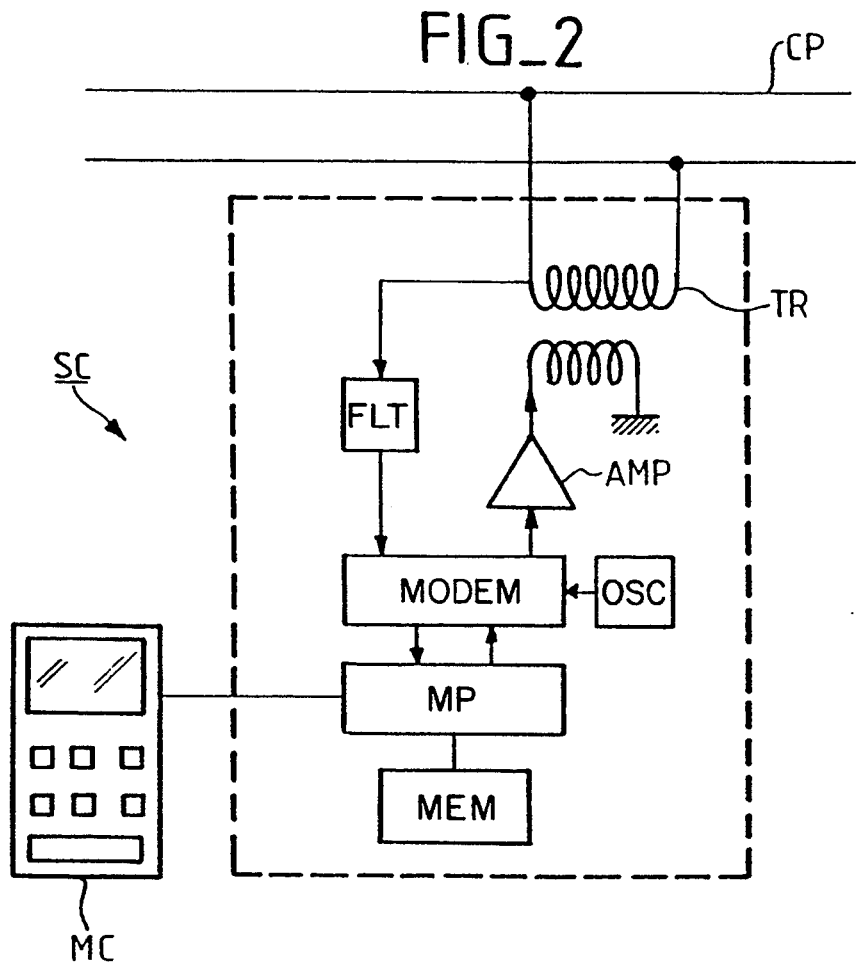
FIG_2

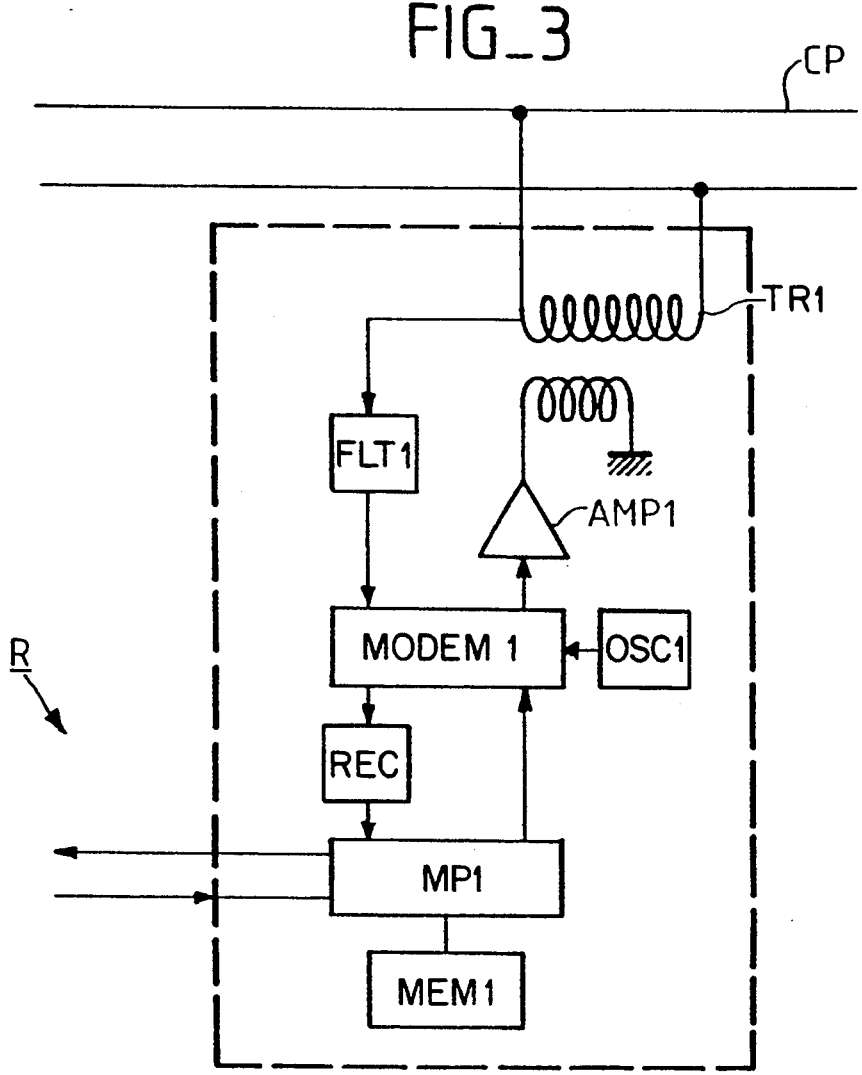
FIG_3
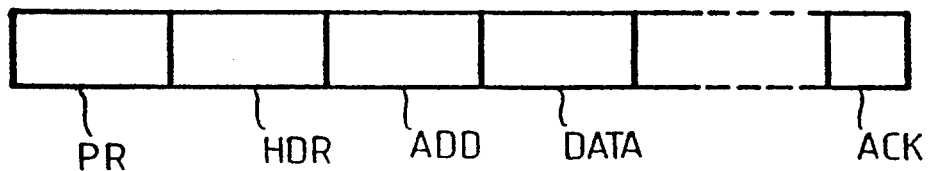
FIG_4

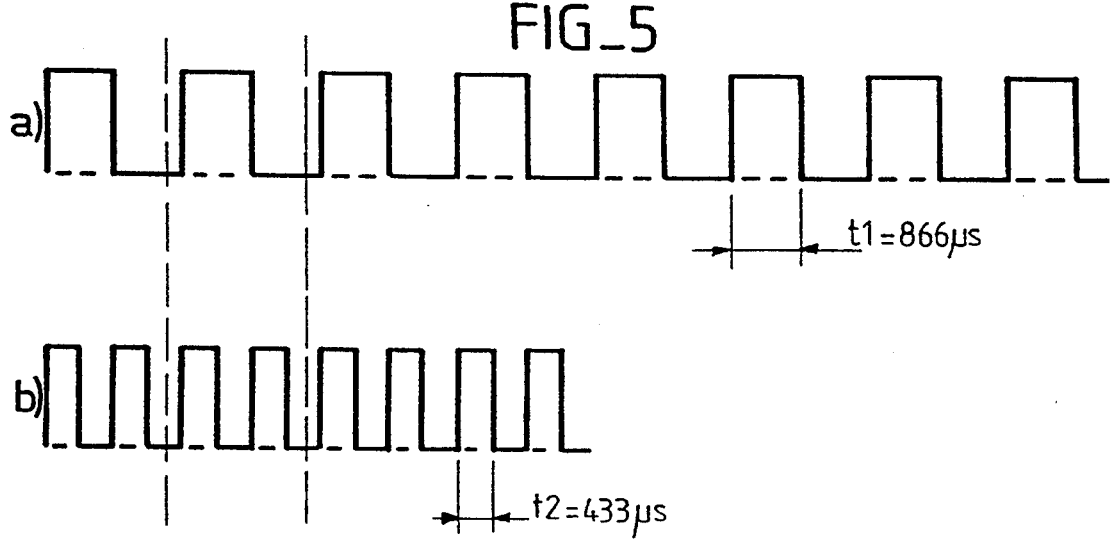
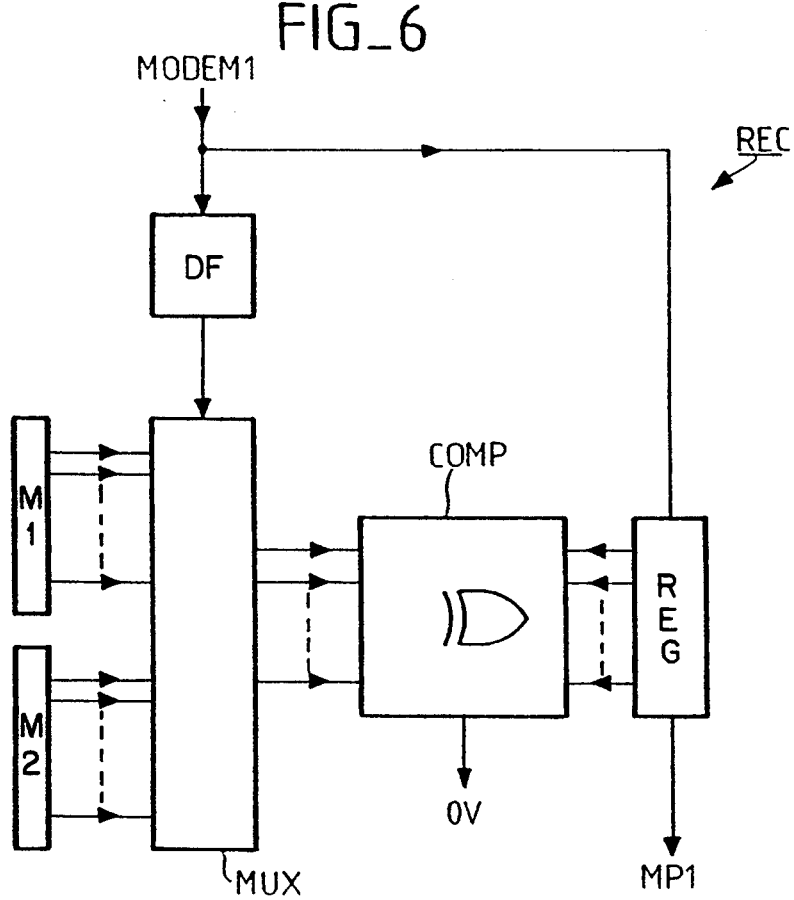

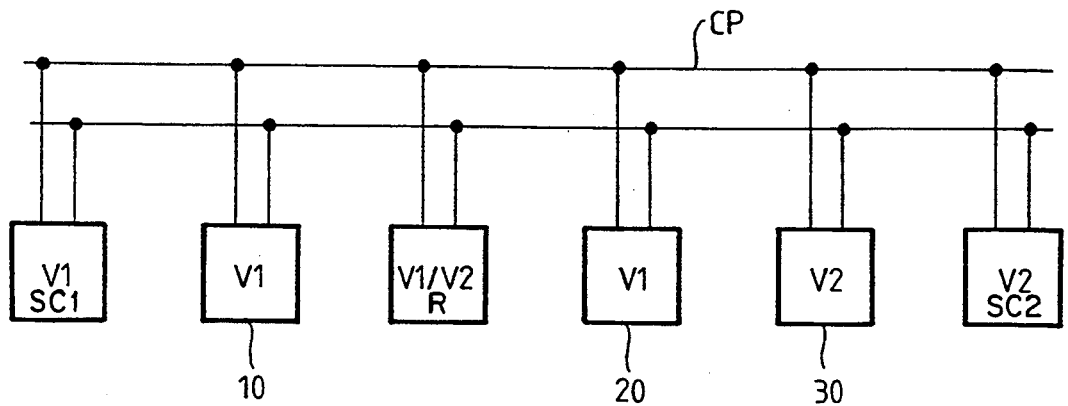
FIG_7

SYSTEM FOR THE TRANSMISSION OF DATA IN AN INSTALLATION, NOTABLY A DOMESTIC INSTALLATION

BACKGROUND OF THE INVENTION

1. Field of the Invention

The present invention relates to a system for the transmission of data in an installation comprising a plurality of devices distributed in a network of an information transmission medium.

The invention can be applied in an especially advantageous way, but not exclusively, to the field of the computerized management of domestic installations.

2. Description of the Prior Art

In the context of the computerized management of domestic installations, the devices of an installation generally comprise one or more control stations designed to receive instructions relating to the working of other devices such as the various appliances of the installation: television set, refrigerator, washing machine, radiator etc. These instructions may be, for example, ON and OFF instructions coming from a user or from the appliances themselves. In turn, the control station or stations send said appliances commands in the form of a message making it possible notably to obtain the desired modifications of operation. These commands are usually sent by means of various types of information transmission media such as carrier current, coaxial cables, twisted pairs, infrared radiation and RF links as well as optical fibers, ultrasonic links etc. Although its scope of application is very general, the invention relates more particularly to the carrier current medium, which is a favored medium for domestic installations.

The installation envisaged here may be of the localized intelligence type with only one control station receiving messages from appliances and mechanisms acting as enslaved stations and sending them towards other stations. In a distributed intelligence type of installation, each device can play the master or slave role by self-programming without going through the control station which only listens to the messages.

The appliances designed to be integrated into an installation for the computerized management of domestic appliances are generally designed by the manufacturers to work in a given configuration of reception defined, for example, by a command message transmission speed that depends on the type of appliance concerned. It is thus that heating appliances can work with a relatively low speed of 300 bauds, this speed being, however, quite insufficient for lighting devices which require a substantially higher transmission speed of at least 1200 bauds.

So as to enable these various appliances to coexist in one and the same network of an information transmission medium, steps towards bringing the different approaches into line with one another were initiated in 1991, and were aimed at stipulating a single transmission speed of 1200 bauds.

However, it is expected that, in the near future, devices, namely control stations or appliances, working at higher transmission speeds of 2400 bauds for example, are likely to be connected to installations that meet the present standard.

SUMMARY OF THE INVENTION

Hence, the aim of the present invention is to propose a system for the transmission of data in an installation comprising a plurality of devices distributed over a network conveying an information transmission medium, each device being capable of receiving and sending data elements at one of at least two transmission speeds, a system that makes it possible, firstly, to achieve communication between devices that belong to one and the same installation but have different transmission speeds and, secondly, to make existing installations and future installations compatible with each other by incorporating the present European standard.

According to the invention, this aim is achieved through the fact that said data transmission system also comprises at least one device, called a relaying apparatus, provided with means for the reception and transmission of data at each of said transmission speeds so as to provide for the transmission of data elements among devices working at different transmission speeds.

As shall be seen in detail further below, said relaying apparatus is capable, firstly, of communicating with the devices working at the rated transmission speed of the installation and, secondly, of acting as a relay, in both reception and transmission, for the other devices working at another transmission speed.

BRIEF DESCRIPTION OF THE DRAWINGS

The following description, made with reference to the appended drawings, which are given by way of non-restrictive examples, will provide a clear understanding of the content of the invention and of the way in which it can be obtained.

FIG. 1 is a drawing showing an installation that comprises a data transmission system according to the invention between a control station and several appliances distributed on a carrier current line;

FIG. 2 is a drawing of the control station of FIG. 1;

FIG. 3 is a drawing of the relaying apparatus of FIG. 1;

FIG. 4 shows the typical composition of a message transmitted among the different devices of the installation of FIG. 1;

FIG. 5 exemplifies a preamble of the message of FIG. 4: a) for a transmission speed of 1200 bauds, b) for a transmission speed of 2400 bauds.

FIG. 6 is a drawing of speed recognition means of the relaying device of FIG. 1;

FIG. 7 shows a variant, using two control stations, of the installation of FIG. 1.

MORE DETAILED DESCRIPTION

FIG. 1 shows a schematic view of a system for the transmission of data in a domestic installation comprising a plurality of devices SC, 10, 20, 30, distributed in a network of an information transmission medium, herein the carrier current CP. The transmission of the data elements among the different devices of the installation is done solely through the power supply network of mains circuit and not through a transmission line reserved for the flow of information elements. However, should such a line exist, it could equally well be used for this purpose.

The devices constituted by the control station SC and the appliances 10, 20 are capable of receiving and sending data at a transmission speed V1 of 1200 bauds for example, while the appliance 30 can receive and send data elements only at another transmission speed V2 of 2400 bauds for example. This situation is liable to occur when, to a first-generation installation working at the speed V1, there is added a second-generation device, such as the appliance 30, working at the speed V2 which is generally greater than V1. It is clear that, under these conditions, there is no communication possible between the devices SC, 10, 20 on the one hand and the appliance 30 on the other hand.

To overcome this situation it is provided, in accordance with FIG. 1, that said data transmission system will also include at least one device, called a relaying apparatus herein referenced R, provided with means for the reception and transmission of data elements at each of the transmission speeds V1, V2, so as to ensure the transmission of data between the devices working at different transmission speeds.

The data elements are transmitted on the network of the carrier current CP by a double frequency modulation of a given carrier frequency, the binary information elements 0 and 1 being represented, for example, by the respective presence of a first modulation frequency of 132 kHz and a second modulation frequency of 133 kHz.

The general constitution of the control station SC is given in FIG. 2. The station preferably has a microprocessor circuit to send out control signals and to receive and process the received signals. This circuit has its own working programs, which are controlled by the user, for example by means of a panel MC comprising a control keyboard and a control screen. It is also arranged for the microprocessor to be controlled by a personal microcomputer: the user can then define the working programs of the microprocessor at will.

Apart from the microprocessor MP and its program and working memories MEM, the circuit has the means needed to set up the signals to be transmitted by the carrier current CP. These means preferably comprise an oscillator OSC to set up a carrier frequency. The output of the oscillator is applied, through a modulator/demodulator MODEM, to an amplifier AMP and the output of the amplifier AMP is applied to the primary winding of a transformer TR, the secondary winding of which is connected to the electrical mains circuit or supply network conveying the carrier current CP.

The information elements that come from the carrier current CP and are intended for the control station SC arrive through the transformer TR. They are sent to a filtering cell FLT that enables the detection of the presence of a modulation in the supply network. The output of the filtering cell is sent to the MODEM and shaped. The output of this circuit is connected to the microprocessor MP. The signals received from the network of the other appliances of the system are demodulated and converted into sequences of binary pulses that can be exploited by the microprocessor MP.

Furthermore, a data processing circuit is associated with each appliance connected to the power supply network conveying carrier current.

FIG. 3 shows the general constitution of the processor circuit associated with the relaying apparatus referenced R.

This circuit 30 is constituted, in practice, like the circuit of FIG. 2, but it is not controlled by a keyboard and a screen. It has a microprocessor MP1 with a program memory MEM1 enabling said microprocessor to carry out predetermined operations under the control of the signals received from the network. It also includes a transformer TR1 through which the carrier frequency modulation signals can be transferred to or received from the network. It also includes the modulation, filtering and demodulation means needed to convert these signals into a form that can be used by the microprocessor: these means are OSC1, MODEM1, AMP1, FLT1 exactly as in the circuit of the control station SC.

Finally, the microprocessor MP1 is connected to the appliance with which it is associated. This link enables, firstly, the transmission of commands to the appliance and, secondly, if necessary, the receiving of information elements from said appliance including, for example, data elements on its state of operation. The specific features of this link depend naturally on the type of appliance to be controlled, the commands that can be given to it and the information elements that are to be collected.

During the reception of commands from the network, the microprocessor MP1 may carry out programs stored in its program memory.

In addition to this structure which is common to all the processor circuits of the appliances connected to the carrier current CP network, the relaying apparatus R has the particular feature of comprising means REC to recognize the speed of transmission of the data elements received from the other devices of the installation, notably the control station SC. This recognition then makes it possible to inform the microprocessor MP1 of the sampling frequency at which it must work.

The general operation of the installation of FIG. 1 is then the following.

During the stage of initialization of the installation, the relaying apparatus R transmits a first take-over message at the transmission speed V1. This take-over message is aimed at making a search, in the network, for an device capable of managing the operation of the apparatus R, namely the functions of turning it on and off, measuring consumption, pricing, safety etc.

This message has the general structure shown in FIG. 4 with, notably, a preamble PR, a header HDR, an address zone ADD comprising the address of the sender of the message and those of the addressees, a data zone DATA and, if necessary, an acknowledgment zone ACK in which the sender of the message indicates whether or not he wishes to receive a message of acknowledgment in response to the message sent. In most cases, the control station SC will be the only device concerned by the presence of the apparatus R in the network of the carrier current CP. The control station SC will store the address of the relaying apparatus R as well as its two transmission speeds V1, V2 in memory and will send a response message, at the speed V1, to the apparatus R informing it that it has been taken over by the control station SC.

The apparatus R then sends a second take-over message at the transmission speed V2 and this message remains, in this case, without response.

During the same initialization phase, the appliance 30 will send a take-over message at the transmission speed V2. This take-over message will be received only by the relaying apparatus R. This apparatus, since it is dependent on the control station SC, will transmit the message that it has received from the appliance 30 at the speed V2 to said control station at the speed V1. In the same way, the control station SC will store, in its memory, the address of the appliance 30, its transmission speed V2 as well as the fact that the apparatus R acts as a relay for the appliance 30.

During the working of the installation, it may happen that the control station SC needs to have the information elements coming from the appliance 30: if this appliance is a temperature probe, for example, the control station SC will have to have the information on temperature before stopping a heating appliance or turning it on. Since the control station SC has memorized the fact that the appliance 30 only works at the speed V2 and that said appliance therefore cannot be interrogated directly, said control station will send the interrogation message to the address of the relaying apparatus R which will repeat the message to the address of the appliance 30 at the speed V2. The interrogated appliance 30 will send the information requested to the control station SC through the relaying apparatus R.

In one variant of operation, the appliance 30 may send the information on temperature periodically at the speed V2, this information being repeated to the control station SC at the speed V1. The advantage of this mode of operation lies in the fact that there is no need for the control station to interrogate the appliance 30 through the relaying apparatus R.

The foregoing description pertains to the implementing of a relaying apparatus R capable of sending an information element dedicated to a given device of the installation, for example the information on temperature, to the control station SC. If another appliance is concerned by the same information element, for example a radiator as regards temperature, then during the initialization stage the control station SC will have to inform the relaying apparatus in such a way as to make it capable of sending the information comprehensively to all the devices of the installation concerned by this information. In dedicated operating mode, the message sent by the relaying apparatus R includes the address of the device for which it is intended. In comprehensive operating mode, the message may include a comprehensive address for all the devices concerned, or it may include no address at all.

As indicated in FIG. 7, two control stations may be connected to the carrier current network of the installation, one of them, SC1, working at the transmission speed V1 and the other, SC2, working at the speed V2.

When the installation is initialized, the appliances and the apparatus working at the transmission speed V2, namely the apparatus R and the appliance 30, are taken over by the control station SC2 with which they may exchange information elements.

Furthermore, the relaying apparatus R informs the second control station SC2 about the presence, in the installation, of the first control station SC1 and of the appliances 10, 20, taken over by the first control station SC1.

The user then has a choice between two possibilities:
the control station SC1 continues to manage the appliances 10, 20, the control station SC2 managing the apparatus R and the appliance 30. If the second station SC2 needs to communicate with the appliances 10, 20, it will use the relaying apparatus R. This is also the case with the first station SC1 if it needs to communicate with the appliance 30;
the control station SC2 will manage all the appliances and the apparatus, in doing so directly for the apparatus R and the appliance 30, and indirectly by means of the relaying apparatus R for the appliances 10, 20.

The means for recognizing the speed of transmission of the data elements received by the relaying apparatus R shall now be described in detail with reference to FIGS. 5 and 6.

The means REC for recognizing the speed of transmission include first of all means to estimate said speed on the basis of the number of signal edges present during a given period of time in the preamble PR of the digitized message of FIG. 4, after demodulation of frequency by the MODEM 1.

An example shall be taken where the preamble PR is given by the hexadecimal pattern AAAA, i.e. 16 bits with 1 and 0 alternately, as can be seen in FIG. 5. FIG. 5 a) shows the preamble for a speed V1 of 1200 bauds, the duration of a bit being $t1 = 866$ $\mu s$ while in FIG. 5 b) the transmission speed V2 is 2400 bauds with a with a bit duration $t2$ of 433 $\mu s$.

It is clear that, for a same given period of time of 1.733 ms for example, defined by the two lines of dashes, it is possible to detect a rising edge and a descending edge when the speed of transmission is 1200 bauds, against 2 rising edges and 2 descending edges for a speed of 2400 bauds. It is then enough, as can be seen in FIG. 6, to place a detector of edges DF at the output of the demodulator of the MODEM1 of the relaying apparatus R to have an estimate of the speed of transmission of the received data elements.

In order to avoid an error in the estimation of the speed of transmission due to the detection of parasitic edges, means are provided, in the form of back-up or redundant means, to confirm the estimated speed.

The principle of this confirmation consists in comparing the header HDR of the message received, following the preamble PR, with a pattern M1 or M2 memorized in said confirmation means, characteristic of the speed estimated by the estimation means. The patterns M1 and M2 are 16-word bits, for example, respectively representing the transmission speed V1 and the transmission speed V2.

In a practical way, the circuit shown schematically in FIG. 6 works as follows. The estimation circuit DF, after having for example detected a message at the estimated speed of V1, causes a 16-bit multiplexer MUX to switch over to the pattern M1 which is then applied to a first input of a 16-bit digital comparator COMP. The digitized message coming from the MODEM1 is applied to a 16-bit register which is itself connected to a second input of the comparator COMP. The comparison is done when the 16 bits of the header HDR are present in the register REG. The comparator COMP then delivers a validation command OV whose value depends on the result of the comparison. If the contents of the header HDR are identical with the pattern selected by the estimation means, in this case the pattern M1, the estimated speed is confirmed and the validation command OV is equal to 1, the message being then transmitted in its entirety to the microprocessor MP1. Should the comparison be negative, the validation command OV is equal to 0 and the transmission of the message to the microprocessor MP1 is interrupted until the next sequence.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

In particular, although it has been disclosed with reference to only two transmission speeds of 1200 and 2400 bauds, the invention could also be carried out with more than two speeds of 300, 600, 900, 1200, 2400 bauds, etc.

What is claimed is:

1. A system for the transmission of data elements in an installation having a plurality of devices connected into a network of an information transmission medium, each device being capable of receiving and sending data elements at one of at least two predetermined transmission speeds, wherein said system further comprises at least one relaying device, said relaying device including means for receiving and means for transmitting data elements at each of said at least two predetermined transmission speeds so as to allow the transmission of data elements among devices from the plurality of devices working at different transmission speeds by relaying the data element at an appropriate speed, the means for receiving and means for transmitting operating responsively to an indicative signal, said means for receiving including recognition means for estimating the transmission speed of a data element received by the relaying device by analyzing a first portion of the data element and including confirmation means for confirming whether the speed estimated by the recognition means is correct by analyzing a second portion of the data element, the confirmation means providing the indicative signal to the means for receiving and means for transmitting.

2. The data transmission system according to claim 1, wherein said data elements are transmitted in the installation in the form of a message that is digitized and frequency modulated.

3. The data transmission system according to claim 2, wherein said recognition means includes means for estimating said transmission speed on the basis of the number of signal edges detected during a predetermined period of time in a preamble of said data elements, so as to provide a estimated speed.

4. The data transmission system according to claim 1, wherein said recognition means includes means for estimating said transmission speed on the basis of the number of signal edges detected during a predetermined period of time in a preamble of said data elements, so as to provide a estimated speed.

5. The data transmission system according to claim 4, wherein said confirmation means compares a header of the received, data element following the preamble, with a pattern memorized in said confirmation means, characteristic of the estimated speed, said confirmation means performing the comparison responsively to the means for estimating.

6. The data transmission system according to claims 1, 2, 4 or 5, wherein said relaying device is capable of sending an information element dedicated to a given device of the installation.

7. The data transmission system according to any of the claims 1, 4 or 5, wherein said relaying apparatus is capable of sending a comprehensive information element to a set of devices of the installation.

8. The system of claim 1 wherein the network is a power supply network and wherein the data elements are formed from a carrier current transmitted on the network.

9. The system of claim 8 wherein the relaying device includes a transformer having a first winding connected to the network and a second winding for receiving data elements from the relaying device to be transmitted on the network.

10. The system of claim 1 wherein the means for receiving and transmitting includes means for interrupting the transmission of data when the indicative signal indicates that there is no confirmation of speed.

11. A method for transmitting and receiving data elements from a plurality of devices connected into a network, wherein each device is capable of receiving and transmitting data elements at one of at least two predetermined transmission speeds, the method comprising the steps of:
   a) a first device transmitting a data element at a first transmission speed on the network;
   b) a relaying device receiving the transmitted data element from the first device and estimating the transmission speed at which the data element was transmitted by analyzing a first portion of the data element;
   c) the relaying device confirming whether the estimated speed is correct by comparing a header of the data element with a stored value corresponding to the estimated speed;
   d) if during step (c) the relaying device confirms that the estimated speed is correct, the relaying device transmitting the received data element on the network at a second transmission speed.

12. The method of claim 11 wherein the data elements that are transmitted and received on the network are formed into digitized messages and the digitized messages are transmitted and received using frequency modulation.

13. The method of claim 11 wherein during step (d) the speed of the received message is estimated by counting edges of a preamble of the data element for a predetermined duration.

14. The method of claim 11 wherein prior to step (a) a control station connected to the network initializes the relaying device by providing the relaying device with a comprehensive address corresponding to a second plurality of devices, and wherein during step (d), the relaying device relays the message using the comprehensive address rather than an address that was received in the received data element.

* * * * *